(12) United States Patent
Zbeda et al.

(10) Patent No.: US 11,790,719 B2
(45) Date of Patent: Oct. 17, 2023

(54) TAMPER RESISTANT PUBLIC LEDGER VOTING SYSTEM

(71) Applicants: Oren Zbeda, Bnei Brak (IL); Eran Eliyahu Tobul, Bal Harbour, FL (US)

(72) Inventors: Oren Zbeda, Bnei Brak (IL); Eran Eliyahu Tobul, Bal Harbour, FL (US)

(*) Notice: Subject to any disclaimer, the term of this patent is extended or adjusted under 35 U.S.C. 154(b) by 0 days.

(21) Appl. No.: 17/683,365

(22) Filed: Mar. 1, 2022

(65) Prior Publication Data
US 2022/0189232 A1      Jun. 16, 2022

Related U.S. Application Data

(63) Continuation-in-part of application No. 17/106,130, filed on Nov. 29, 2020, now Pat. No. 11,361,606.

(51) Int. Cl.
  *G07C 13/00*  (2006.01)
  *H04L 9/32*   (2006.01)

(52) U.S. Cl.
  CPC .......... *G07C 13/00* (2013.01); *H04L 9/3236* (2013.01); *H04L 9/3263* (2013.01); *H04L 2209/463* (2013.01)

(58) Field of Classification Search
  CPC ..... G07C 13/00; H04L 9/3236; H04L 9/3263; H04L 2209/463
  USPC ....................................................... 235/386
  See application file for complete search history.

(56) References Cited

U.S. PATENT DOCUMENTS

| 11,361,606 B1 * | 6/2022 | Zbeda | G07C 13/00 |
| 2020/0219351 A1 * | 7/2020 | Cho | G07C 13/00 |

* cited by examiner

*Primary Examiner* — Daniel A Hess

(57) ABSTRACT

There is disclosed an electronic voting system for tamper resistant voting. In some embodiments of a system and/or method for allows a voter to verify that his vote was recorded properly and/or allows public counting of votes by any entity. For example, the system may record information on a distributed ledger that prevents changing of votes. For example, enough data may be available to each voter to check that his vote was recorded properly and/or to substantiate and/or prove if it was not recorded properly. For example, public data may be recorded anonymously such that a third party may be able to access the number of votes, but not the identify of individual voters. Optionally, the individual voter may be supplied a way to substantiate a claim that he voted for either party of the election.

17 Claims, 7 Drawing Sheets

TAMPER RESISTANT PUBLIC LEDGER VOTING SYSTEM

RELATED APPLICATION/S

This application is a Continuation in part of U.S. patent application Ser. No. 17/106,130 filed 29 Nov. 2020 the contents of which are incorporated herein by reference in their entirety.

FIELD AND BACKGROUND OF THE INVENTION

The present invention, in some embodiments thereof, relates to an electronic voting system and, more particularly, but not exclusively, to a system and method for tamper resistant voting.

U.S. Pat. No. 7,099,471 appears to disclose, "A facility for discerning corruption of an electronic ballot . . . . The facility sends from a first computer system to a second computer system an encrypted ballot that reflects a ballot choice selected by a voter. The facility then sends a confirmation from the second computer system to the first computer system, which serves to convey the decrypted contents of the encrypted ballot as received at the second computer system, and which is generated without decrypting the encrypted ballot. In the first computer system, the facility uses the confirmation to determine whether the decrypted contents of the encrypted ballot as received at the second computer system match the ballot choice selected by the voter."

US Patent Application Publication No. 20020077885 appears to disclose, "A method of holding an election including enabling voters to register with a registrar facility by providing encryption keys to registered voters and storing the encryption key with an authenticator facility. The method includes distributing ballots having unique ballot ID's to requesting voters, receiving ballots having voter choices on them and encrypted using voters encryption keys, receiving from voters' ballot ID, encrypted vote information and, voter ID at an authenticator facility, indications that votes have been cast with a ballot having indicated ballot IDs at a distributor facility, and an indication that the voter has voted at a registrar facility. The method includes authenticating the voter at the authenticator facility and passing authenticated votes and the ballot ID to a counter facility."

US Patent Application Publication No. 20020133396 appears to disclose, "A method and system for securely voting over a network, such as a global computer network, involves a system which delivers an electronic ballot from a server with the server's private key and a vote serial number on the ballot to an individual terminal connected to the network. The ballot may be filled in and a subset of the filled-in ballot is created with a digital signature created from the individual's secret key on the subset of the ballot corresponding to the ballot choices. The subset of the filled-in ballot together with the individual's electronic signature, and a vote serial number is then delivered to the server. A data element is then created to record a subset of the ballot in a data store at the server, in which the ballot vote information is retained as a vote."

U.S. Pat. No. 5,495,502 appears to disclose, "A number-theoretic based algorithm . . . for secure electronic voting. A voter may cast a vote among n centers in a manner which prevents fraud and authenticates the votes. Preprocessing allows for nearly all of the communication and computation to be performed before any voting takes place. Each center can verify that each vote has been properly counted. The algorithm is based on families of homomorphic encryptions which have a partial compatibility property. The invention can be realized by current-generation PCs with access to an electronic bulletin board."

US Patent Application Publication No. 20190005756 appears to disclose that, "A method allows a random sample of a large population of voters to cast votes and for both the unpredictability/un-manipulability of the sample selection and the integrity of the tally to be verified by any interested parties using public information. The problem of vote selling is addressed. Also, a variant allows voters to remain substantially anonymous."

U.S. Pat. No. 7,210,617 appears to disclose that, "An election system provides, in one example, each voter with multiple physical 'layers' that the voter is able to choose between. The voter takes part of the layers as a kind of receipt and the other layers are retained and/or destroyed by the system. The actual vote is not readily revealed by the layers taken by the voter, thus protecting against improper influence. In the voting booth, when all the layers are combined, however, the voter is readily able to verify the vote. Moreover, posted images of the layers not taken by the voter can be used to compute the election results in a way that is verifiable by interested parties. The results cannot be changed without substantial probability of detection and privacy of votes can be maintained unless a number of parties are compromised or collude.

Chinese Patent Application Publication No. CN109523683 appears to disclose, "a kind of blank electronic voting methods based on block chain technology; this process employs homomorphic encryption algorithms to hide ballot content; guarantee the validity of ballot paper using zero-knowledge proof technology simultaneously; collection, count of votes process and the result of ballot paper, which disclose, to be carried out on block catenary system; wherein; trusted computation environment is utilized in the decryption of voting results, solves the problems, such as that voting results decrypting process private key is touched net under traditional approach, truly protects the blank attribute of ballot."

US Patent Application Publication No. 20190005756 appears to disclose, "an electronic voting system in which a polling administration unit, upon receiving encoded vote content data encoded by a temporary key from a voting unit, generates a reference value capable of identifying sameness of the encoded vote content data and sends it to a voter list administration unit, the voter list administration unit receives the temporary key, the reference value of the encoded vote content data, and voter identification data for identifying a voter from the voting unit, determines that a vote is valid when the reference value received from the voting unit and the reference value received from the polling administration unit match as well as a voter identified by the voter identification data is qualified by voter list data."

SUMMARY OF THE INVENTION

According to an aspect of some embodiments of the invention, there is provided a method for on-line voting including: distributing a plurality of respective private keys and associated public keys anonymously to each respective voter of a plurality of voters; publishing a list of the plurality of public keys on a secure public ledger; receiving an encrypted vote, encrypted with the respective private key of the respective voter; recording the encrypted vote on a the secure public ledger; and reading the encrypted vote from the secure public ledger for counting an election result.

According to an aspect of some embodiments of the invention, there is provided a method for on-line voting including: distributing a plurality of respective private keys and associated public keys and verification materials anonymously to each respective voter of a plurality of voters; publishing a list of the plurality of public keys on a secure public ledger; verifying the plurality of respective private keys and associated public keys with the verification materials; receiving an encrypted vote, encrypted with the respective private key of the respective voter; recording the encrypted vote on a the secure public ledger; and reading the encrypted vote from the secure public ledger for counting an election result.

According to some embodiments of the invention, the method further includes: publishing a time of receiving of the respective private keys in the secure public ledger.

According to some embodiments of the invention, the time is approximate.

According to some embodiments of the invention, the public ledger includes a block chain.

According to some embodiments of the invention, the method further includes: validating the encrypted vote by an election commission and further encrypting the encrypted vote after the validating with a private key of the election commission resulting in a double encrypted validated vote and wherein the recording is of the double encrypted validated vote.

According to some embodiments of the invention, the verification materials include a hash key and the verifying includes checking the plurality of respective private keys and associated public keys against the hash key.

According to some embodiments of the invention, the method further includes: publishing a list of voters having received a private key of the plurality of respective private keys on the secure public ledger.

According to some embodiments of the invention, the method further includes: verifying.

According to some embodiments of the invention, the distributing includes distributing a respective vote changing key of a plurality of respective vote changing private keys, the method further including adding a changed vote encrypted with the respective vote changing key after the recording and wherein the counting the election result includes counting the changed vote and not counting the respective encrypted vote.

According to some embodiments of the invention, the method further includes: separating the plurality of respective private keys into batches and wherein the distributing is separate for each of the batches.

According to some embodiments of the invention, the method further includes: supplying a mechanism to the respective voter to check that his vote is recorded properly on the secure public ledger.

According to an aspect of some embodiments of the invention, there is provided a system for on-line voting including: a plurality of respective private keys and associated public keys and verification materials supplied anonymously to each respective voter of a plurality of voters; a secure public ledger including a list of the plurality of public keys; and a vote of the respective voter with the respective private key of the respective voter.

According to some embodiments of the invention, the secure public ledger further includes a time of receiving of the respective private keys.

According to some embodiments of the invention, the verification materials contain a hash function for checking the validity and matching of the plurality of respective public and private keys.

According to some embodiments of the invention, the system further includes: a validation private key and wherein the vote is validated by an election commission and encrypted with the validation private key resulting in a double encrypted validated vote and wherein the vote of the respective voter in the secure public ledger includes the double encrypted validated vote.

According to some embodiments of the invention, the secure public ledger further includes a time of receipt of each private key of the plurality of respective private keys.

According to some embodiments of the invention, the system further includes: a respective vote changing private key for each respective private key and wherein the system is further configured for adding a changed vote encrypted with the respective vote changing to the secure public ledger.

According to some embodiments of the invention, the plurality of respective private keys are separated into batches.

According to some embodiments of the invention, the system further includes: a mechanism for the respective voter to check that his vote is recorded properly on the secure public ledger.

According to some embodiments of the invention, the system further includes: a substantiation of a vote of configured for sending to the respective voter. According to some embodiments of the invention, the method further includes: publishing a time of receiving of the respective private keys in the secure public ledger.

According to some embodiments of the invention, the time is approximate.

According to some embodiments of the invention, the public ledger includes a block chain.

According to some embodiments of the invention, the method further includes: validating the encrypted vote by an election committee and further encrypting the encrypted vote after the validating with a private key of the election committee resulting in a double encrypted validated vote and wherein the recording is of the double encrypted validated vote.

According to some embodiments of the invention, the method further includes: publishing a list of registered voters on the secure public ledger.

According to some embodiments of the invention, the method further includes: publishing a list of voters having received a private key of the plurality of respective private keys on the secure public ledger.

According to some embodiments of the invention, the method further includes: publishing a time of receiving of the private key.

According to some embodiments of the invention, the time is approximate.

According to some embodiments of the invention, the distributing includes giving to the respective voter a physical machine readable medium including the respective private key.

According to some embodiments of the invention, the physical machine readable medium includes a dongle.

According to some embodiments of the invention, the method further includes: generating the plurality of respective private keys in a number exactly equal to a number of registered voters.

According to some embodiments of the invention, the distributing includes distributing a respective vote changing key of a plurality of respective vote changing private keys, the method further including adding a changed vote encrypted with the respective vote changing key after the recording and wherein the counting the election result includes counting the changed vote and not counting the respective encrypted vote.

According to some embodiments of the invention, the method further includes: separating the plurality of respective private keys into batches and wherein the distributing is separate for each of the batches.

According to some embodiments of the invention, an identity of a batch of each associated public keys is published in the secure public ledger.

According to some embodiments of the invention, the method further includes: supplying a mechanism to the respective voter to check that his vote is recorded properly on the secure public ledger.

According to some embodiments of the invention, the method further includes: supplying the respective voter with a substantiation of his vote.

According to some embodiments of the invention, the method further includes: supplying the respective voter with a substantiation of a vote that is not his vote.

According to an aspect of some embodiments of the invention, there is provided a method for voting including: voting anonymously by a voter; checking by a voter of how a vote of the voter was recorded; and supplying to the voter with a substantiation of is true vote.

According to some embodiments of the invention, the vote is recorded on a secure public ledger.

According to some embodiments of the invention, the method further includes: supplying the voter with a substantiation of a vote that is not his true vote.

According to some embodiments of the invention, the method further includes: supplying the voter with an identification substantiating an identity of his vote.

According to some embodiments of the invention, the identification includes a half key and wherein the substantiating entails completing the half key with a second half key.

According to some embodiments of the invention, the second half key includes a private key in possession of an election authority.

According to an aspect of some embodiments of the invention, there is provided a system for on-line voting including: a plurality of respective private keys and associated public keys supplied anonymously to each respective voter of a plurality of voters; a secure public ledger including a list of the plurality of public keys; and a vote of the respective voter with the respective private key of the respective voter.

According to some embodiments of the invention, the secure public ledger further includes a time of receiving of the respective private keys.

According to some embodiments of the invention, the time is approximate.

According to some embodiments of the invention, the public ledger includes a block chain.

According to some embodiments of the invention, the system further includes: a validation private key and wherein the vote is validated by an election committee and encrypted with the validation private key resulting in a double encrypted validated vote and wherein the vote of the respective voter in the secure public ledger includes the double encrypted validated vote.

According to some embodiments of the invention, the secure public ledger further includes a list of registered voters.

According to some embodiments of the invention, the secure public ledger further includes a list of voters having received a private key of the plurality of respective private keys.

According to some embodiments of the invention, the secure public ledger further includes a time of receipt of each private key of the plurality of respective private keys.

According to some embodiments of the invention, the time of receipt is approximate.

According to some embodiments of the invention, the system further includes: a physical machine readable medium including a respective private key of the plurality of respective private keys for distribution to the respective voter.

According to some embodiments of the invention, the physical machine readable medium includes a dongle.

According to some embodiments of the invention, a number of the plurality of respective private keys is exactly equal to a number of the plurality of registered voters.

According to some embodiments of the invention, the system further includes: a respective vote changing private key for each respective private key and wherein the system is further configured for adding a changed vote encrypted with the respective vote changing to the secure public ledger.

According to some embodiments of the invention, the plurality of respective private keys are separated into batches.

According to some embodiments of the invention, the secure public ledger further includes an identity of a batch associated the each of the associated public keys.

According to some embodiments of the invention, the system further includes: a mechanism for the respective voter to check that his vote is recorded properly on the secure public ledger.

According to some embodiments of the invention, the system further includes: a substantiation of a vote of configured for sending to the respective voter.

According to some embodiments of the invention, the system further includes: a substantiation of a vote configured identifying the voter.

According to some embodiments of the invention, the substantiation includes a half key configured to identify the voter when completed by another half key.

According to some embodiments of the invention, the another half key is a private key in possession of an election authority.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) and/or a mesh network (meshnet, emesh) and/or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks might be expected to use completely different methods, e.g., making use of expert knowledge and/or the pattern recognition capabilities of the human brain, which would be vastly more efficient than manually going through the steps of the methods described herein.

Data and/or program code may be accessed and/or shared over a network, for example the Internet. For example, data may be shared and/or accessed using a social network. A processor may include remote processing capabilities for example available over a network (e.g., the Internet). For example, resources may be accessed via cloud computing. The term "cloud computing" refers to the use of computational resources that are available remotely over a public network, such as the internet, and that may be provided for example at a low cost and/or on an hourly basis. Any virtual or physical computer that is in electronic communication with such a public network could potentially be available as a computational resource. To provide computational resources via the cloud network on a secure basis, computers that access the cloud network may employ standard security encryption protocols such as SSL and PGP, which are well known in the industry.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Overview

Figure 1:
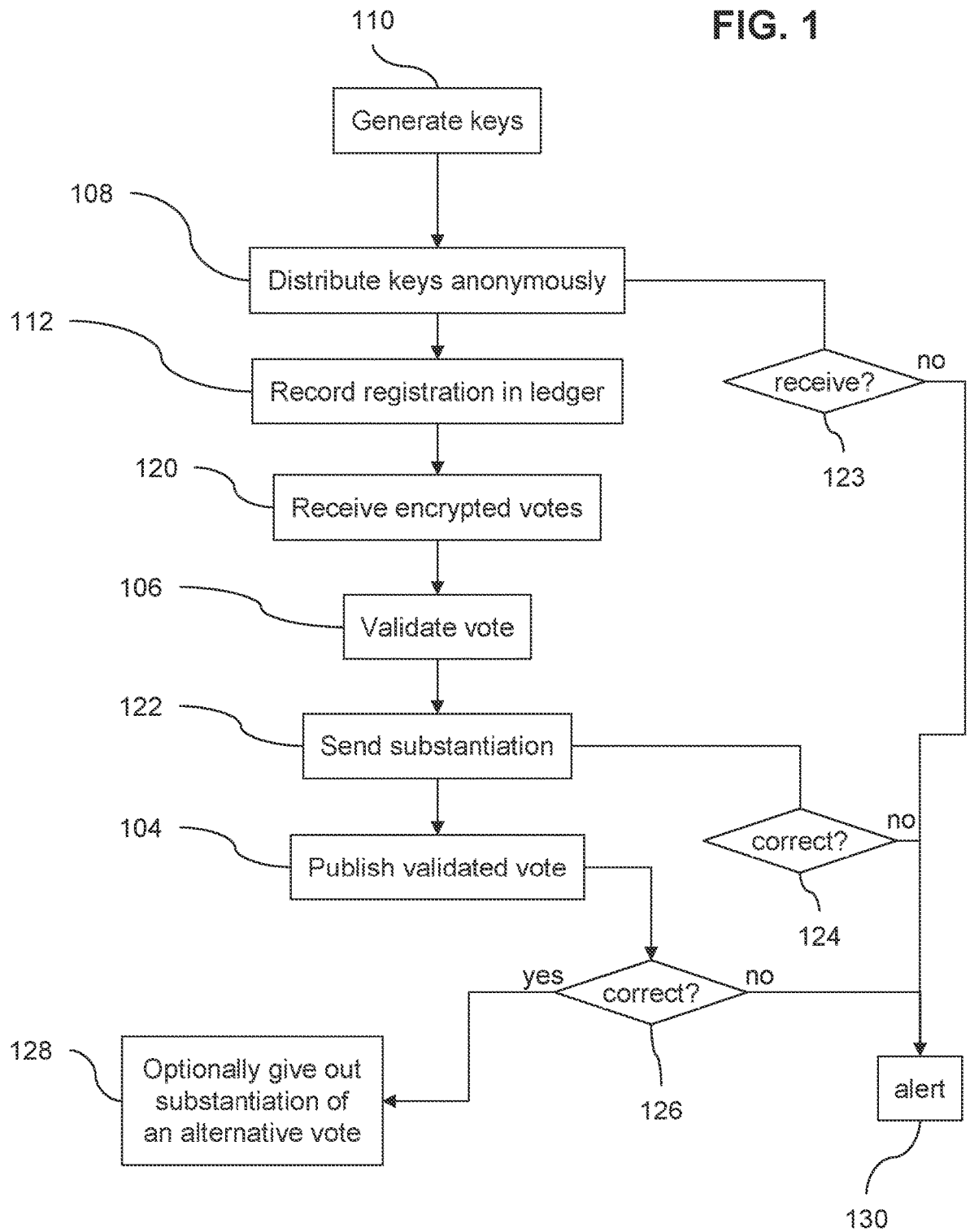
FIG. 1 is a flow chart illustration of a method of voting in accordance with an embodiment of the current invention.
Figure 2:
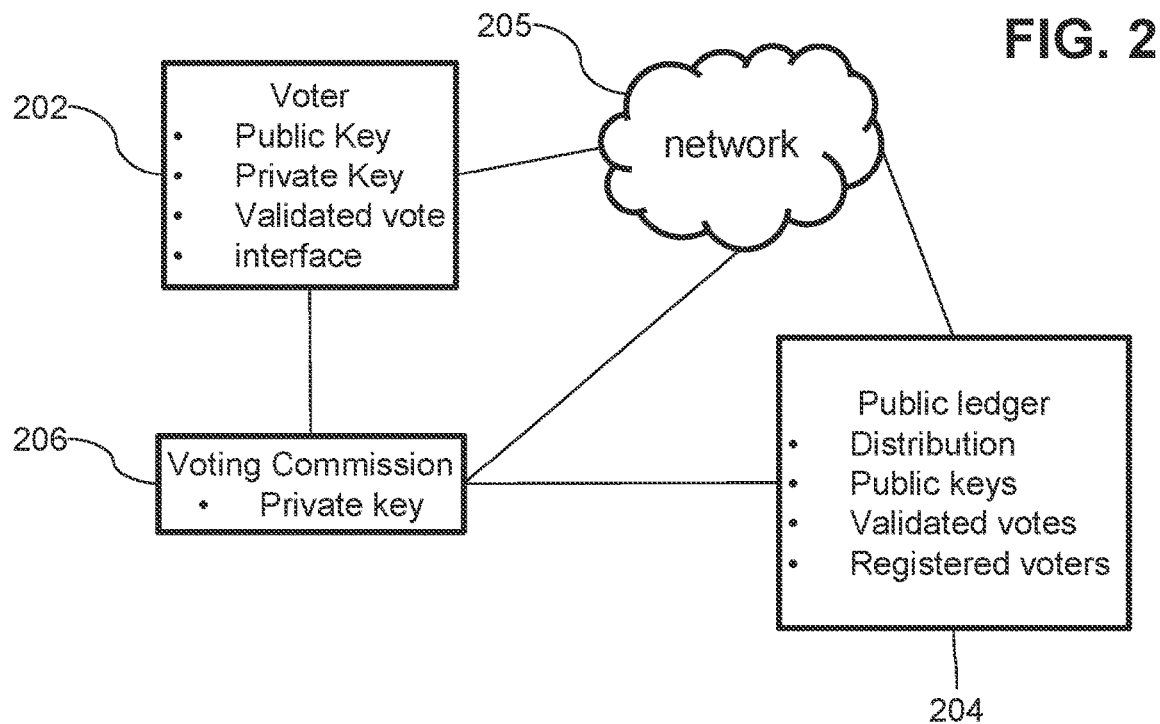
FIG. 2 is a block diagram of a system of voting in accordance with an embodiment of the current invention.
Figure 3:
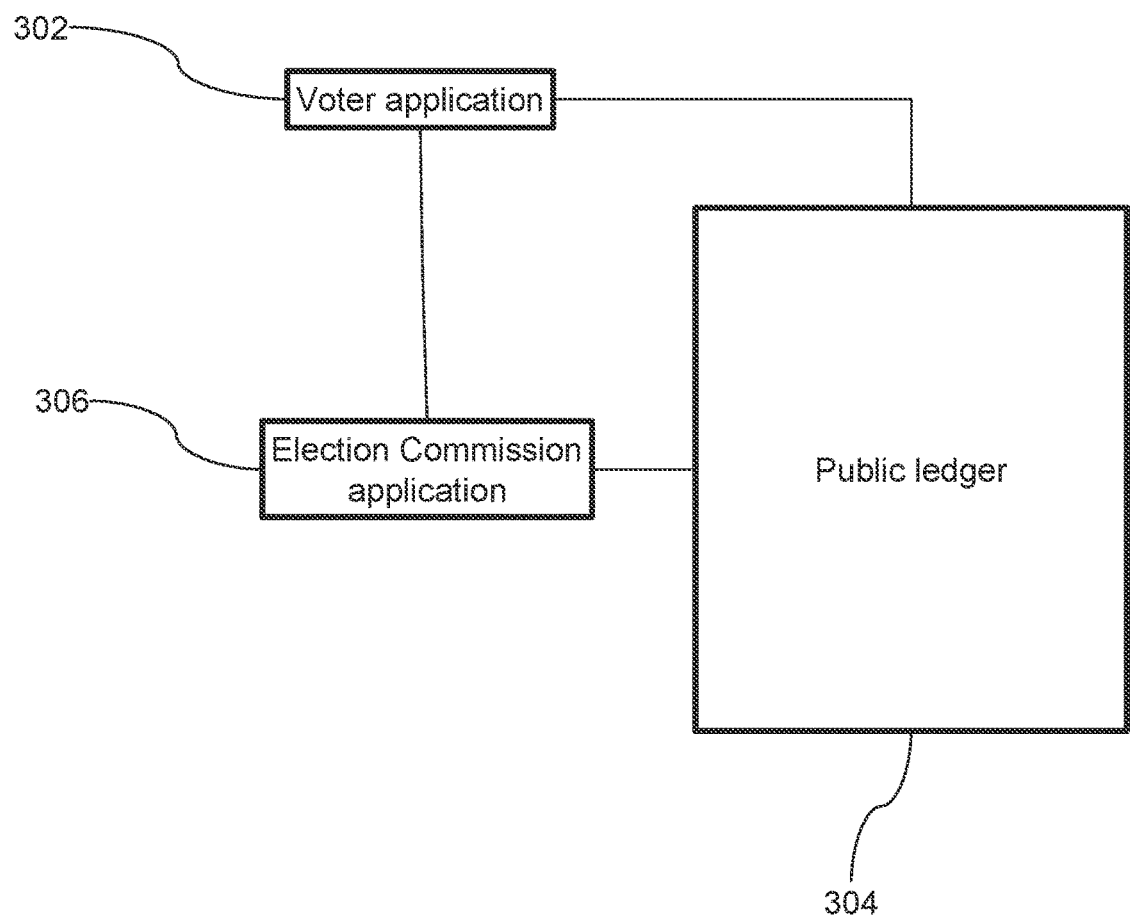
FIG. 3 is a block diagram of a system of voting in accordance with an embodiment of the current invention.
Figure 4:
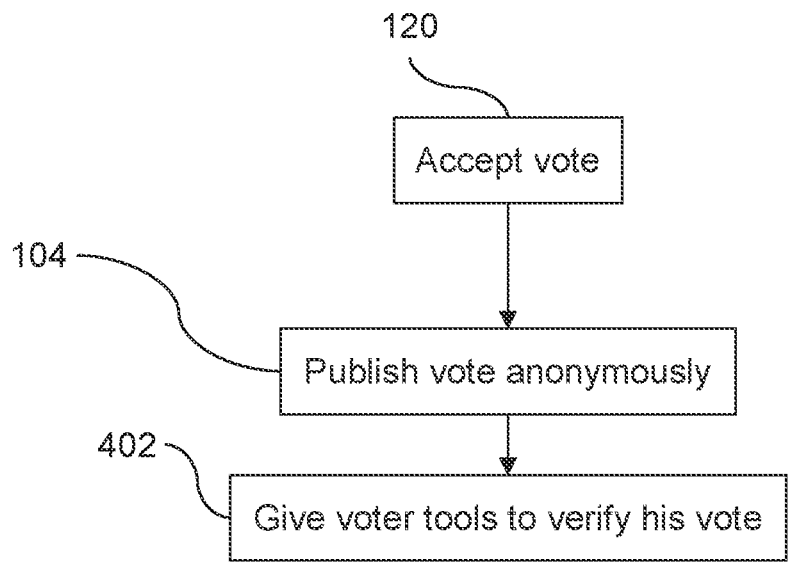
FIG. 4 is a flow chart illustration of a method of verifying a vote in accordance with an embodiment of the current invention.

The present invention, in some embodiments thereof, relates to an electronic voting system and, more particularly, but not exclusively, to a system and method for tamper resistant voting.

According to an aspect of some embodiments of the invention, there is provided a system and/or method for on-line voting including: distributing a plurality of respective private keys and associated public keys anonymously to each respective voter of a plurality of voters; publishing a list of the plurality of public keys on a secure public ledger; receiving an encrypted vote, encrypted with the respective private key of the respective voter; recording the encrypted vote on a the secure public ledger; and/or reading the encrypted vote from the secure public ledger for counting an election result.

According to some embodiments of the invention, the system and/or method may protect a voting process with without the need at any stage to rely on any person and/or group of people, optionally including the developers of the program, people operating the system, the members of the election commission, etc.

An aspect of some embodiments of the current invention relates to a system and/or method for voting that allows a voter to verify that their vote was recorded properly and/or allows public counting of votes by any entity and/or protects the integrity of the results even from the developers of the program, people operating the system, the members of the election commission, and/or from hackers that may compromise the security of the system.

In some embodiments, the system may record information on a distributed ledger that prevents a hacker from changing the votes. For example, enough data may be available to each voter to allow him to check that his vote was recorded properly and/or to substantiate and/or prove if it was not recorded properly and/or to prove that his vote was not recorded to his satisfaction.

For example, public data may be recorded anonymously such that a third party may be able to access the number of votes, but not the identify of individual voters.

In some embodiments, the individual voter may be supplied a way to substantiate a claim that he voted for either party of the election. For example, this may inhibit voter extorsion and/or buying votes. For example, a private identification half key may be supplied which when completed with another second private half key identifies the public key of the voter. For example, the other private half may be in possession of the election commission. Optionally, a voter may use this key to positively identify that they are the real voter. For example, the voter may use this key to report an irregularity and/or nullify a previous vote and/or change a vote. Optionally use of this key may entail some voter action (e.g., to inhibit fraudulent use of the key).

For example, in order to use the identification half key (e.g., get access to second private half key) a voter may be required to identify himself (e.g., to the election commission) and/or to show up at the election commission in person and/or to sign a declaration that they are not committing fraud and/or coercing another voter. According to some embodiments of the invention, the use of this half will facilitate reporting of irregularities and/or nullifying false vote while allowing the election commission to investigate the circumstances and prevent misuse of the identification key. For example, this may inhibit use of stolen keys and/or coercing a vote to give over his key when coercing a voter's vote. In some embodiments, only a full private key (e.g., the private key used for voting and/or the combination of the private identification half key with the elections commission's half) can be associated to a public key, so the half key does not give away the voter's vote According to some embodiments of the invention, a method of voting will inhibit cheating in elections, whether the cheating is perpetrated by a person and/or a group of persons, some embodiments of the current invention may inhibit the cheating by developers who wrote the software and/or hackers.

In some embodiments, even if a hacker succeeds in breaking into an election computer system, some embodiments of the current will prevent him from changing the election results. In some embodiments of the current invention, voter anonymity will be maintained. In some embodiments, in accordance with the current invention facilitates secure voting without voters going to a polling station.

According to some embodiments of the invention, the voting system may include an open application programming interface (API). Optionally, anyone may use the interface in order to vote and/or to verify voting. Optionally, political body and/or individual may develop an application for voting and/or to check the votes based on the voting system. For example, a party and/or a candidate and/or another organization may develop and application.

According to some embodiments of the invention, the system and/or method may deliver voting keys to a voter. Optionally, delivery may be digital and/or physical. Optionally, the voting keys may be transferred to the election areas, to post office branches, and/or to designated voting stations. Optionally, the voting keys may be delivered directly to registered voters physically, by messenger and/or collection by the voter from a post office branch and/or a designated voting station. Optionally, the voting keys may be distributed in advance of the election. Optionally, each voter who receives voting keys may be identified, for example by an identification document. Optionally, receipt of voting keys by a voter may be documented.

According to some embodiments of the invention, the system and/or method may require that the voter scans one or more voting and/or verification keys on receipt of the voting keys in order to verify voting keys are valid. Optionally, the check may be performed by crosschecking of the private key with the published public key, and/or the change key. Optionally, this may prevent a situation in which voting keys may be stolen. Optionally, faulty keys may be replaced to prevent a future complaint about a forgery of their contents.

According to some embodiments of the invention, the voting keys may be distributed in batches. Optionally, in case fraud may be found in the election process, it may be possible to focus on a problematic area, and to repeat the election only in that area, based on the problematic batch.

According to some embodiments of the invention, receipt of voting keys may be published in a ledger. Optionally, the ledger may be accessible by the public, the political parties, and/or by the government. Optionally, a voter, political party, and/or government may check if a citizen received their voting keys, for example, by ID number and date it was issued. Optionally, no information may be collected about a voter's use of the voting keys at this stage, for example, if they voted or did not vote, and there may be no identifying information linked to the voting keys which would allow connection between the voting keys to their recipient. Optionally, political parties may automatically receive access to full information while committing to maintaining the confidentiality of the information.

According to some embodiments of the invention, the voting keys may comprise one or more public keys, one or more private keys, one or more change keys, and/or one or more public and or private complain keys. Optionally, the private keys may comprise half a key. Optionally, the second half of the one or more private keys may be in possession of the election commission, election committee, or other election authority.

According to some embodiments of the invention, the voter may vote at the voting station with the assistance of a computer which will be at the voting station, or by a home computer, or by their cellular telephone with the assistance of an application.

According to some embodiments of the invention, voting may be performed by scanning and/or typing one or more voting keys and selection of a party and/or candidate. Optionally, the application may sign with the vote with the private key. Optionally, the application may send the vote together with the public key to the application programming interface (API) of the voting system which may register the vote. Optionally, it may be possible to vote and/or to use the voting keys only once. Optionally, the API may prevent attempts to vote repeatedly.

According to some embodiments of the invention, at the end of the voting time, all voting keys which have not been used (that is: not delivered) may be opened, and the election commission may provide them with the value "not in use".

According to some embodiments of the invention, after use, the public keys and/or private keys may be published in a ledger. Optionally, the ledger may be accessible by the public, the political parties, and/or by the government. Optionally, there may be no identifying information in the ledger, only what vote corresponds to a specific public key, and/or what private key used it.

According to some embodiments of the invention, any citizen may request to receive "used" voting keys. For example, voting keys that cannot be used to vote. For example, these voting keys may be passed on to people in order to prevent pressuring a person to disclose their voting data. For example, a voter may request voting keys which correspond to a particular party and/or candidate, and then present the used voting keys which they received as their own voting keys. Optionally, this may prevent pressuring a voter and/or paying a voter to vote in a certain way, since it will not be possible to verify how they voted.

According to some embodiments of the invention, after the ledger may be made public, any voter may verify that their vote is recorded, that their vote is recorded correctly, and/or that their vote may be counted correctly.

According to some embodiments of the invention, the number of voting keys which were "not in use" in addition to the number of delivered voting keys may be published, and must match the number of voting keys published as being distributed to each area. Optionally, a mismatch may indicate illegal use of voting keys not delivered to voters and/or theft of voting keys. Optionally, this may prevent theft of voting keys and/or their use.

According to some embodiments of the invention, a voter may verify their vote and may discover that it was not counted and/or reported correctly. Optionally, the voter may complain with the assistance of a second pair of voting keys. Optionally, it may be necessary to submit an official complaint. Optionally the official complaint may be documented including the complainants' details. Optionally, the complainant may present their public change key and will receive the second half of their private change key, with the assistance of which a correction may be made to the previous vote. Optionally, if a correction registered, this corrected vote may be counted instead of the original vote. Optionally, a voter may be required to physically arrive at a dedicated voting station or post office branch in order to change their vote. Optionally, a voter's details and/or the change in vote may be documented. Optionally, this may prevent theft of change keys.

According to some embodiments of the invention, a complaint stage after initial voting may prevent a theft of voting keys and/or returning used voting keys to a batch.

Alternatively, and/or additionally, a complaint stage after initial voting may prevent hacking into the voting system. Optionally, voters may complain about the changed vote and/or their inability to vote, and they may be able to change their vote. Optionally, the amended vote may be recorded and/or reported in the ledger.

According to some embodiments of the invention, the election commission may be required to documentation a complaint and/or change of vote. Optionally, documentation may be required at the very end of the voting process, a voter verifies their vote and may find a complaint in their name and/or an amended vote, which they may not has submitted. Optionally, discovery of a false change of vote may be evidence of fraud. Optionally, the vote may be cancelled, and the election repeated for a particular area or batch of voting keys, and/or criminal investigation.

According to some embodiments of the invention, after the complaint stage the results may be published, to which the list of the complaints may be added. Optionally, at this stage people may still complain if their vote was changed without their knowledge. Optionally, the election commission may be required to present documentation of the complaint in order to justify the changes.

Specific Embodiments

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced and/or carried out in various ways.

Distribution

According to some embodiments of the invention, a list is generated of eligible voters. According to some embodiments of the invention, the system or/and method may deliver one or more voting keys to each eligible voter. Optionally, the distribution 108 may be anonymous. Optionally, delivery may be digital (e.g., by email, by downloading an application, etc. which may be encrypted, and which may be accessed by the voter after verification of their identity) and/or physical (e.g., recording a voting key onto a computer readable media and/or distributing the media to a voter, such as a dongle, an envelope comprising one or more voting keys, signing for a letter, etc.). Optionally, each media includes a means of identification.

According to some embodiments of the invention, the voting keys may be transferred to the election areas, to post office branches, and/or to designated voting stations. Optionally, the voting keys may be delivered directly to registered voters physically, by messenger and/or collection by the voter from a post office branch and/or a designated voting station. Optionally, the voting keys may be distributed in advance of the election. Optionally, each voter who receives voting keys may be identified, for example by an identification document. Optionally, receipt of voting keys by a voter may be documented.

For example, a voter may receive an envelope, comprising one or more voting keys. The envelope may be anonymous, without any identifying number and/or name printed on the outside of the envelope, and/or on the voting keys.

According to some embodiments of the invention, the method may require that the voter scans one or more voting and/or verification keys on receipt of the voting keys in order to verify voting keys are valid. Optionally, the verification may be performed by crosschecking of a private key with a published public key, and/or the change key. Optionally, verification may prevent theft of one or more voting keys. Optionally, verification may identify faulty and/or fake voting keys. Optionally, faulty voting keys may be replaced. Optionally, verification may be electronic. Optionally, receipt of one or more voting keys may be confirmed using an electronic signature (HASH) so as to prevent the possibility of changing the data. For example, details of dates, times, identification, location, vote may be hashed.

According to some embodiments of the invention, the voting keys may be distributed in batches 702. Optionally, in case fraud may be found in the election process, it may be possible to focus on a problematic area, and to repeat the election only in that area, based on the problematic batch. For example, the batch may include a number of voting key sets that is exactly equal to the number of registered voters.

According to some embodiments of the invention, distribution and/or receipt of voting keys may be documented. Optionally, distribution and/or receipt of voting keys may be published in a ledger. Optionally, the ledger may be accessible by the public, the political parties, and/or by the government. Optionally, a voter, political party, and/or government may check if a citizen received their voting keys, e.g., by identity number, passport number, phone number, etc. For example, a voter may check if they are listed on the ledger as a registered voter and/or if they are listed on the ledger as having received a key. Optionally, no information may be collected about a voter's use of the voting keys at this stage, for example, if they voted or did not vote. Optionally, there may be no identifying information linked to the voting keys which would allow connection between the voting key and their recipient. Optionally, interested parties may automatically receive access to full information while committing to maintaining the confidentiality of the information.

In some embodiments, security measures (such as counting and checking) may catch misuse of keys and/or misappropriations of mail and/or votes. Nevertheless, keys and/or registration may be handled with high security e.g., to reduce the need to declare a mis-vote and/or repolling.

Voting

According to some embodiments of the invention, a set of public/private voting key sets are generated 110 (e.g., each voting key may be generated randomly). Optionally, dedicated hardware may be used to generate voting keys.

According to some embodiments of the invention, a set of voting keys may comprise one or more full or partial public voting keys, one or more full or partial private voting key, and/or one or more full or partial change keys 602, and/or one or more full or partial verification keys 202.

According to some embodiments of the invention, the ledger may include which voters are registered and/or which voters have received a key and/or when and/or which public keys have been distributed 108. Optionally, there is no record and/or it is not known which specific voter received which specific key. Optionally, each private key is revealed only to the voter to whom it pertains.

According to some embodiments of the invention, one or more private keys may comprise half a key 202. Optionally, the second half key may be a private key in the possession of the voting commission 206 and/or another authority. Optionally, a voter may receive the second half of their private key on accessing the application to vote and/or the combination of both halves of the private key may sign and/or encrypt and/or validate the vote.

According to some embodiments of the invention, each set includes a public key and/or a matching private key. For example, a voter may encrypt their ballot with the private key and/or the ballot may be decrypted with the public key.

Alternatively and/or additionally, there may be further keys in a key set, for example a key may exist that is used for changing a vote and/or identifying a user reporting voting fraud.

According to some embodiments of the invention, voting may be performed by scanning and/or typing the public key into an application, or interface, and selection of a party or candidate. Optionally, the application may send the vote together with the public key to the application programming interface (API) of the voting system which may register the vote. Optionally, any legal vote may be signed with a private key that corresponds to one of the public keys. Optionally, the public keys may be recorded in a ledger. Optionally, the ledger may be freely accessible for viewing by the public e.g., all people and parties. Optionally, it may be possible to vote and to use a voting key only once. Optionally, the API may prevent repeated attempts to vote using the same voting key.

According to some embodiments of the invention, a voter may include encrypting information with their private key. For example, the voter may place their choice on a ballot and encrypt the ballot with their private key. The encrypted ballot is then sent to an election commission, with their public key and/or an identification of the public key In an embodiment, a public key of the election commission may be identified by a pointer to the public key on the distributed ledger. The election commission optionally receives 120 encrypted votes and/or or validates 106 the votes. For example, the election commission may check that the vote fits a valid public key that was distributed to a voter and/or has not yet been used.

According to some embodiments of the invention, the election commission may further encrypt the ballot with a private key of the election commission. Optionally, when the vote is invalid, the election commission may send a notification to the voter. Optionally, when the vote is valid, a substantiation of the voter's vote, for example the double encrypted validated vote, may be sent back 122 to the voter as a record of their vote.

According to some embodiments of the invention, after use, the public keys and/or private keys may be published in a ledger. Optionally, the ledger may be accessible by the public, the political parties, and/or by the government. Optionally, information identifying the voter may be kept out of the ledger and/or kept secret (for example, encrypted and/or available only to selected individuals and/or organizations). For example, what vote corresponds to a specific public key and/or what private key used it and/or other information such as the date or time of voting may be included.

For example, the validated vote may be sent 122 directly to the voter and/or recorded 104 in the ledger. The voter may check 124, 126 the validated vote (e.g., a received version and/or the recorded version e.g., decrypting the vote with their public key and the public key of the election commission). Optionally, if the vote is not recorded correctly the voter may be alerted to fraud.

According to some embodiments of the invention, each person may vote at the voting station with the assistance of a computer which will be at the voting station, or by a home computer, or by their cellular telephone with the assistance of an application 302 selected from a body trusted by them. Optionally, a person attempting to vote may experience connection problems, in which case, they may physically go to a voting station to cast their vote.

According to some embodiments of the invention, any political party and/or independent body may open an application to vote and to ensure the validity of the voting keys and/or the vote, in addition to the election commission's application According to some embodiments of the invention, signed voting data may be published in full to the public at the end of the voting period, e.g., including the private keys used to sign the votes. Optionally, until the voting is finalized, signed voting data may only be available to the election commission.

According to some embodiments of the invention, at the end of the voting time, all voting keys which have not been used (that is: not delivered) may be opened, and the election commission may provide them with the value "not in use" 804.

According to some embodiments of the invention, any citizen may request to receive "used" voting keys. For example, voting keys that cannot be used to vote. For example, these voting keys may be passed on to people in order to prevent pressuring a person to disclose their voting data. For example, a voter may request voting keys which correspond to a particular party and/or candidate, and then present the used voting keys which they received as their own voting keys. Optionally, this may prevent pressuring a voter and/or paying a voter to vote in a certain way, since it will not be possible to verify how they voted.

According to some embodiments of the invention, after the ledger is made public, any voter may verify that their vote is recorded, that their vote is recorded correctly, and/or that their vote will be counted correctly.

According to some embodiments of the invention, the number of voting keys which were "not in use" 806 in addition to the number 802 of delivered voting keys may be published, and together should match the number of voting keys published as being distributed to each area 808. Optionally, a mismatch may indicate illegal use of voting keys not delivered to voters and/or theft of voting keys. Optionally, a mismatch may require investigation. Optionally, this may prevent theft of voting keys and/or their use.

Verifying a Vote

According to some embodiments of the invention, a vote may be recorded 104 in a ledger. Optionally, the vote may be recorded in the ledger along with one or more voting keys, e.g., the public key. Optionally, the party and/or candidate for which the vote was cast may be recorded in the ledger.

According to some embodiments of the invention, a voter may be supplied with tools to verify their vote 402 and/or supply evidence of vote fraud and/or tampering.

According to some embodiments of the invention, the election commission may not know who the voter is. Optionally, a ballot may be decrypted with a valid public key (e.g., a public key that exists on the distributed ledger). For example, this shows that the voter has a valid private key.

According to some embodiments of the invention, the election commission may use different private key for validating 106 a vote sent 122 to a voter to substantiate their vote and for validating 106 a vote recorded 104 to the public ledger.

According to some embodiments of the invention, after publication, voting twice may be inhibited at least because the entry has already been written on the ledger. Optionally, verification tools may include an identification key which is not published and/or may be used to report irregularities.

Optionally, use of the identification key may be connected with steps to avoid abuse. For example, the user may be required to identify himself and/or the identification key may only work when used with a used with a private key in possession of the election commission.

According to some embodiments of the invention, after recording the vote, the voter may check 126 that their vote is recorded 104 correctly to the election commission. Optionally, confirmation of correctly reporting the vote may be made using one or more voting keys. Optionally, a voter may check the public key published in the ledger against their public key. Optionally, any party and/or organization may create a website that, given a public key, validates the vote.

According to some embodiments of the invention, changing the ledger is inhibited because the ledger is configured to inhibit retroactive changes, only new data may be added, e.g., the vote published in ledger is permanent.

According to some embodiments of the invention, a voter may on verifying their vote 402 discover that their vote was not counted and/or reported correctly. Optionally, the voter may complain with the assistance of an additional voting keys. Optionally, it may be necessary to submit an official complaint. Optionally the official complaint may be documented including the complainants' details. Optionally, a photograph may be taken of the complainant. Optionally, a voter may be required to physically arrive at a dedicated voting station or post office branch in order to change their vote. Optionally, a voter's details and/or the change in vote may be documented. Optionally, this may prevent theft of change keys.

According to some embodiments of the invention, if voting keys are leaked prior to distribution and/or voting, then when a voter tries to vote they may receive an error message. Optionally, a voter may file a complaint. Optionally, a voter may prove that they are the real owners of the voting keys by presenting all or part of a voting key or keys. Optionally, the police may investigate a complaint. Optionally, every complaint may be documented. Optionally, false complaint may be identified by presentation of incorrect and/or incomplete voting keys and/or identification document and/or photograph.

Correcting a Vote/Complaint Stage

According to some embodiments of the invention, a medium (e.g., a dongle including a voter's key set burnt thereon, an envelope containing voting keys, a letter in which are printed the voting keys, an email (which may be encrypted, and which may be accessed by the voter after verification of their identity) containing the voting keys, etc.) may include one or more change keys 602. For example, allowing a voter to change their vote (e.g., because they claim that an unauthorized person voted with their key). Optionally, one or more change keys may be incomplete.

According to some embodiments of the invention, requesting and/or filing a complaint and/or change of vote may require the use of one or more additional voting keys. Optionally, the additional keys may be change keys 602. Optionally, the change keys may comprise one or more full or partial public change keys and/or one or more full or partial private change keys. Optionally, a complainant may present their public change key and will receive the second half of their private change key, 602 with the assistance of which a correction may be made to the previous vote. Optionally, if a correction registered, this corrected vote may be counted instead of the original vote.

According to some embodiments of the invention, the election commission may be required to further encrypt a ballot encrypted with the change key 602. Optionally, the election commission may require the voter to came in person with identification to report an irregularity in the voting and/or change their vote. For example, this and/or other restrictions on the change key may inhibit cheating and/or misuse of a change key by a vote coercer to positively identify how a particular voter voted. Optionally, the change key, may be a half key completed by a second public key and/or private key e.g., held by the election commission.

According to some embodiments of the invention, change keys 602 and/or complain keys may be distributed along with the initial voting keys and/or separately to the initial voting keys. Optionally, change keys 602 and/or complaint keys may be distributed after voting to voters who request them upon verification and/or documentation of the voter's identity and/or public voting key and/or private voting key.

According to some embodiments of the invention, a complaint stage after initial voting may prevent a theft of voting keys and/or returning used voting keys to a batch 702. Alternatively, and/or additionally, a complaint stage after initial voting may prevent hacking into the voting system. Optionally, voters may complain about the changed vote and/or their inability to vote, and they may be able to change their vote. Optionally, the amended vote may be recorded and/or reported in the ledger.

According to some embodiments of the invention, the election commission may be required to documentation a complaint and/or change of vote. Optionally, documentation may be required at the very end of the voting process, a voter verifies their vote and may find a complaint in their name and/or an amended vote, which they may not has submitted. Optionally, discovery of a false change of vote may be evidence of fraud. Optionally, the vote may be cancelled, and the election repeated for a particular area or batch of voting keys, and/or a criminal investigation instigated.

According to some embodiments of the invention, after the complaint stage the results may be published, to which the list of the complaints may be added. Optionally, at this stage people may still complain if their vote was changed without their knowledge. Optionally, the election commission may be required to present documentation of the complaint in order to justify the changes.

Inhibiting Vote Buying/Extortion

According to some embodiments of the invention, the system is configured to facilitate a voter hiding and/or falsifying 502 their vote.

According to some embodiments of the invention, the system may supply 128, 502 a voter the option to show to other people substantiation that they voted differently than their actual vote. Optionally, the system may supply 128, 502 a voter a different private key from their private key. For example, the supplied key may include a real private key of a real voter that voted for a different party. Optionally, a voter may claim to have voted for the party of the anonymously published private key and/or hide their real vote. For example, the published public keys may not be visible to all. For example, anyone may request for a public key that belongs to a vote to a specific party. For example, this may inhibit buying and/or extorting votes, because a buyer/extorter will have difficulty knowing for whom the person that they are trying to influence really voted.

According to some embodiments of the invention, in order to change a vote a voter may need to supply proof that they are the real voter. For example, a user may be required to show up at a voting changing station with a physical medium (e.g., a dongle issued by the election commission, letter and/or envelope, etc.) and/or a further means of identification (e.g., an identification document) to show that they are the real voter in order to change their vote. Optionally, changing a vote may require validation, for example via encryption with an election commission private change key. For example, without the private key of the election commission, the change key may not work to change a vote, to vote and/or even to determine a matching public key. For example, if to make use of the change key, a user may be required to go personally to the election commission and/or identify himself.

According to some embodiments of the invention, each voter may check 126 that their vote appears in the ledger exactly as they voted, and if something cheated with their vote, they may alert 130 the authorities and show that the original vote was different, because they have a validated 106 vote encrypted with the private key from the election commission (the confirmed vote).

Additionally and/or alternatively, according to some embodiments of the invention, if their vote fails to appear in the ledger, implying that they did not vote at all, then they may show proof of their vote validated 128 by encryption with their half of the private key and the send half of the private key of the election commission.

According to some embodiments of the invention, the system and/or method may be configured to inhibit an unauthorized person stealing a private key voting and then returning the key to be delivered to a properly registered voter. For example, in some embodiments when the registered voter, comes to vote they may be informed that somebody already voted using their voting keys and be prevented from voting. For example, when a vote is validated 106 the election commission may search the ledger to make ensure that the voter's public key does not appear with a previous vote. Optionally, the system and/or method may facilitate alerting 130 an authority to the problem. Optionally, the previous vote may be invalidated and/or the voter may be allowed to vote. Optionally, if many such aberrations are observed within one batch of keys and/or one election area, then the entire batch and/or election area may be invalidated.

According to some embodiments of the invention, electronic voting may allow elections without interrupted functioning of the country and/or economy.

Unauthorized Use of Unclaimed Keys

According to some embodiments of the invention, the system and/or method may be configured to inhibit the use of unclaimed keys. Optionally, a person may complain that they did not receive voting keys 123, they may physically go to a voting station and show proof of identity and that they are eligible to vote and may receive unallocated voting keys. Optionally, a person may complain that their vote disappeared, but without proof of receipt, e.g., listing in a ledger as having received voting keys and/or all or part of the voting keys, their complaint may be dismissed. Optionally, a person may have voting keys but no proof of receipt, e.g., no listing in the ledger 304, and/or documentation of receipt. Optionally, such a person may be investigated by the police to determine if fraud was committed, particularly if this occurs in large numbers.

According to some embodiments of the invention, the distribution 108 of private keys may be anonymous. For example, the system may be designed so that it is not known and/or hard to know and/or it is not recorded which private key is associated with which voter and/or with which public key.

In some embodiments, it will be difficult to differentiate used private keys from unused keys and/or a person who tries to vote with unused/unclaimed keys will also be using claimed keys and/or cause double voting which will be stopped and/or investigated and/or invalidated the election, for example as described in embodiments above.

According to some embodiments of the invention, each voter may be recorded 112 in the ledger 204 that they received a key from a particular batch. Optionally, if the number of votes in a batch are more than the number 802 of keys distributed then the unauthorized use of the keys may be detected and/or corrective action (e.g., invalidating, investigating) may be undertaken.

Alternatively and/or additionally, the public key of distributed keys may be recorded 112 in the ledger 204. Optionally, if a key that was not distributed is associated with a vote, that vote may be disqualified and/or if there are a large number of such aberrations a batch of keys and/or the election may be disqualified and/or investigation and/or corrective action may be taken.

In some embodiments, keys are separated 702 into batches. Optionally, the names of voters and/or the anonymous numbers of distributed 108 public keys and/or the time of distribution 108 and/or to which batch a public key pertains is recorded 112 in the distributed ledger. If a key is used that was not distributed the vote may be disqualified. When a batch has signs of tampering and/or unusual voter turn out it may be investigated if all of the reported voters really received keys and/or voted. When the time of receiving 120 of a large number of votes doesn't fit the time of distribution 108 of keys, the batch may be investigated. Alternatively or additionally, keys that remain and/or were not distributed 108 may be used by the system to vote as disqualified 804. When the number of votes added to the number of disqualified keys is different from and/or is greater than the number of keys generated 110 then corrective action may be taken.

Voting System

According to some embodiments of the invention, a voter 202 is supplied with a private key and/or a public key and a user interface for voting. For example, the voter may employ the user interface to prepare a ballot with their election choice and to encrypt the ballot and send it to an election commission 206. Optionally communication between the voter 202 and the election commission 206 may be via a network 205 (e.g., the Internet). Alternatively and/or additionally, communication may include a physical medium.

According to some embodiments of the invention, the election commission 206 checks the validity of the ballot received from a voter 202. For example, the election commission may check that no one has voted previously with the private key of the voter 202 and/or check that the private key of the voter 202 corresponds to a valid public key. Optionally, the election commission includes a user interface for facilitating real people performing functions manually. Alternatively or additionally, the election commission includes an automated system (e.g. a processor) for performing the functions. Optionally, the election commission further encrypts the ballot with a private key of the election commission 206 and/or publishes a double encrypted vote on a public ledger 204. Additionally or alternatively, voting commission 206 may send a double encrypted substantiation of the ballot to voter 202.

Optionally, voter 202 has access to public ledger 204 and/or may check that their vote and/or make sure that it is correctly listed. Optionally, various organizations such as political parties and/or poll watchers may read from public ledger 204 and/or check and/or count the election results.

For example, access to the ledger 204 may be available of a public network 205. Optionally, the number of votes in addition to the number of disqualified voting keys 806 in a batch or area may match the number 802 of voting keys received in a batch of voting keys or an area 808. Optionally, if the numbers match, then the election may be validated 810. Optionally, the number of votes in addition to the number of disqualified voting keys 806 in a batch or area may not match the number of voting keys received in a batch of voting keys or an area 808. Optionally, if there is a mismatch, then the election may be invalidated and/or rerun for a particular batch of voting keys or area.

For example, the election commission 306 may send to the user substantiation of their vote by which to support in the case of accused fraud their true vote.

Additionally and/or alternatively, the election commission 306 may supply the voter with false substantiation of another vote (for example, the voter may use the false substantiation to protect himself against vote buyers and/or those who coerce him to vote for a particular party. According to some embodiments of the invention, a public ledger 304 is available to a voter and/or other interested parties (for example, via network access).

For example, envelopes may be distributed envelopes, comprising voting keys, e.g., full or partial public and private voting keys and/or full or partial public and private change keys. The envelope may be anonymous, without any identifying number and/or name printed on the outside of the envelope. The public keys may be kept for later publication.

The envelopes may be transferred to the election areas, to post office branches or to designated voting stations. The envelopes may then be personally distributed to every registered voter. Each person that receives an envelope may be identified and the process of receiving the envelope may be documented. Receipt of the envelopes may be published in a ledger.

On receipt of an envelope, the voter may scan the one or more voting and/or verification keys in order to verify that the envelope is valid. In addition, by publication the documentation of receipt of each envelope may be made public without any voting data e.g., whether they voted or not, and/or for whom they voted.

Voting may be done by scanning one or more public keys from the envelope, and selection of a party and/or candidate. The application may sign with the vote with the private key, and may send it together with the public key to the API of the voting system which may register the vote.

Signed voting data may be published in the ledger at the end of the voting period. At the end of the voting time, all envelopes which have not been used (e.g., not delivered, and/or delivered and not used by the recipient) may receive the value "not in use".

After the publication in the ledger, any person may verify that their vote is recorded correctly.

The number of envelopes which were "not in use" in addition to the number of received envelopes is published, and must match the number of envelopes distributed to each area. A mismatch may indicate illegal use of envelopes not delivered to voters. This may prevent theft of envelopes and their use.

At the end of the voting time and after publication is the verification and change stage. At this stage each person may verify their vote. If they discover their vote was not counted correctly, then they may complain and/or change their vote with the assistance of a second pair of voting keys.

For this it may be necessary to submit an official complaint which may be documented including the complainants' details. The complainant may be required to present their public change key and may receive the send half of their private change key. With the assistance of these two change keys, they may register a changed vote. If a correction is registered, the changed vote may count instead of the original vote. The list of the complaints and/or changed votes may be added to the ledger.

After the change stage the results of the election may finally be published.

At this stage people may still complain e.g., if their vote was changed without their knowledge. However, the election commission may be required to present documentation of the complaint in order to justify the change.

According to some embodiments of the invention, the election is protected from fraud, voting is less disruptive. For example, an election may be held without closing down economy for the election period (e.g., election day). According to some embodiments of the invention, the cost of running an election via on-line voting is much smaller than convention elections (e.g., by reducing the number of people and the infrastructure for managing manual polling stations).

In some embodiments, a list is generated 110 of eligible voters. In some embodiments, a set of public/private key sets are generated 110. For example, the set may include a number of key pairs that is exactly equal to the number of registered voters. Optionally, each set includes a public key and/or a matching private key. For example, a voter encrypts his ballot with the private key and/or the ballot can be decrypted with the public key. Alternatively or additionally, there may be further keys in a key set, for example a key may exist that is used for changing a vote and or identifying a user reporting voting fraud.

In some embodiments, a private key and/or a key set is distributed 108 to each registered voter. Optionally, the distribution 108 is anonymous. The distribution 108 of key sets may be unconditional and/or conditioned. For example, distribution 108 may be conditioned on an act by the registered voter (e.g., acknowledging an email, acknowledging an SMS, requesting a ballot, showing up at a distribution station).

In some embodiments, list of eligible voters is recorded 112 in a secure public form, for example, on a distributed ledger. Additionally or alternatively, all or some of the public keys are recorded 112 in the ledger. Additionally or alternatively, all or some of the recipients of keys are recorded 112 in the ledger. For example, the ledger may be resistant be being changed (e.g., could be blockchain). Optionally, the public record does not include which key belongs to which voter. Optionally, any legal vote must be signed with a private key that corresponds to one of the public keys in the ledger. Optionally, the ledger is always public for all people and parties.

In some embodiments, the time that a voter received his key and/or the time that each public key (with its corresponding private key) was distributed may be recorded on the ledger. Optionally, the time is recorded 112 in a way that facilitates detecting of fraud while inhibiting identifying a voter with a received public key. For example, the times may be recorded only at precision ranging between 1 minute to one hour and/or between 1 hour to 1 day. Alternatively or additionally, keys may be distributed in blocks of size ranging between 10 to 300 and/or between 300 and 3000 and/or between 3000 to 10000 and/or between 10000 to 100000. For example, the length of the time interval and/or size of the block may be at a measured precision to allow tracking of fraud such as some intercepting the key and voting before the registered voter received the key, but course enough to inhibit matching a time of receipt of an individual voter with a time of receipt of a key.

In some embodiments, distributing 108 the private keys may include recording 112 a key onto a computer readable media and/or distributing 108 the media to a voter. Optionally, each media includes an ID. For example, the private key may be burnt onto a dongle and given to a registered voter. Additionally or alternatively, the voter may be given his public key. A voter may check 123 if he is listed on the ledger as a registered voter and/or if he is listed on the ledger as having received a key and/or if his public key is listed as having been received at the correct time. If he is listed, but did not receive a private key and/or he and/or his key is incorrectly listed and/or listed as having been distributed 108 at the wrong time, the voter may alert 130 the authorities that there is an apparent fraud event.

In some embodiments, a medium (e.g., a dongle including a voter's key set burnt thereon) may include a change key. For example, allowing a voter who wants to change his vote (e.g., because he claims that an unauthorized person voted with his key). Optionally, the change key will be incomplete. For example, the change and/or an identification key alone may not be enough to determine what was is the matching public key and/or what is the associated vote. In some embodiments, the election commission may be required to further encrypt a ballot encrypted with the change key. Optionally, the Election require the voter came in person with identification to report an irregularity in the voting and/or change his vote. For example, this and/or other restrictions on the change key may inhibit cheating and/or mis-use of a change key by a vote coercer to positively identify how a particular voter voted. The change key, is optionally a half key completed by a second public key and/or private key. For example, the second key may be on the voter record and/or on the distributed ledger. Alternatively or additionally, the second half key may be a private key in the possession of the voting commission and/or another authority.

Figure 5:
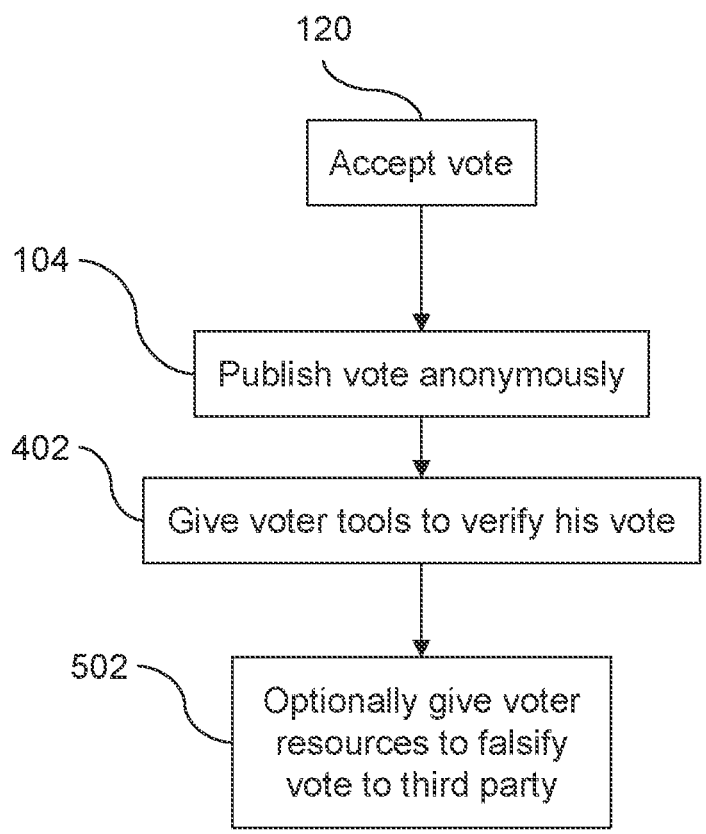
FIG. 5 is a flow chart illustration of a method of preserving anonymity in a vote in accordance with an embodiment of the current invention.
Figure 6:
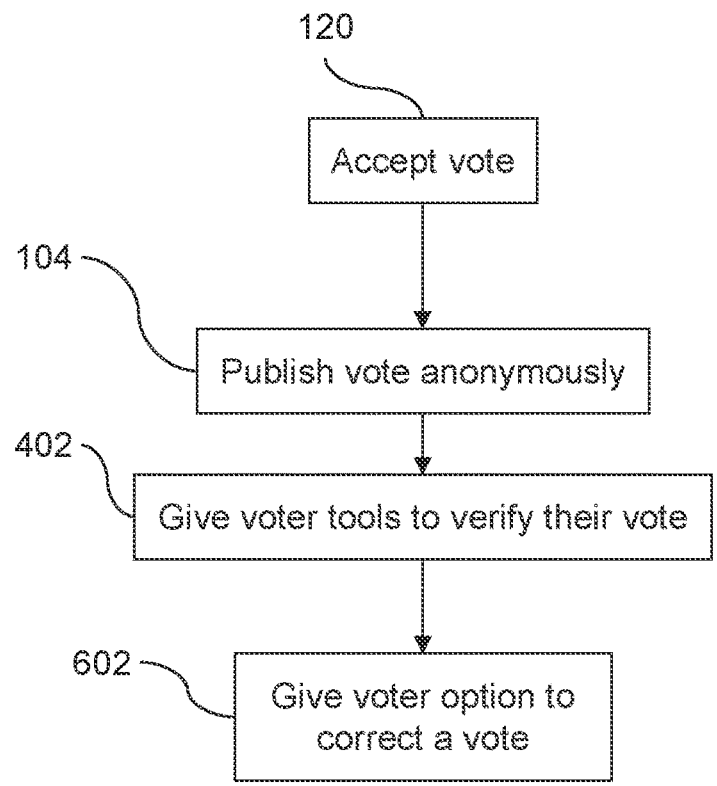
FIG. 6 is a flow chart illustration of a method of determining if cheating occurred and if so to correct it in accordance with an embodiment of the current invention.
Figure 7:
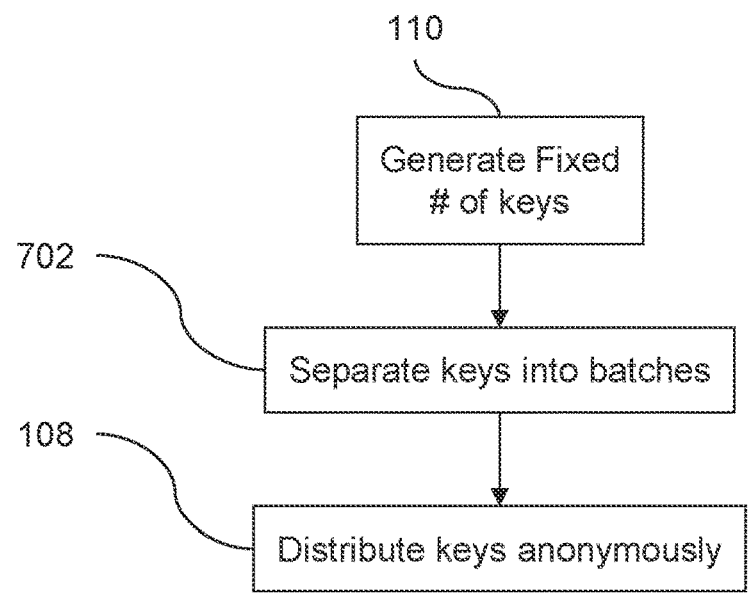
FIG. 7 is a flow chart illustration of a method of inhibiting cheating in a vote in accordance with an embodiment of the current invention.
Figure 8:
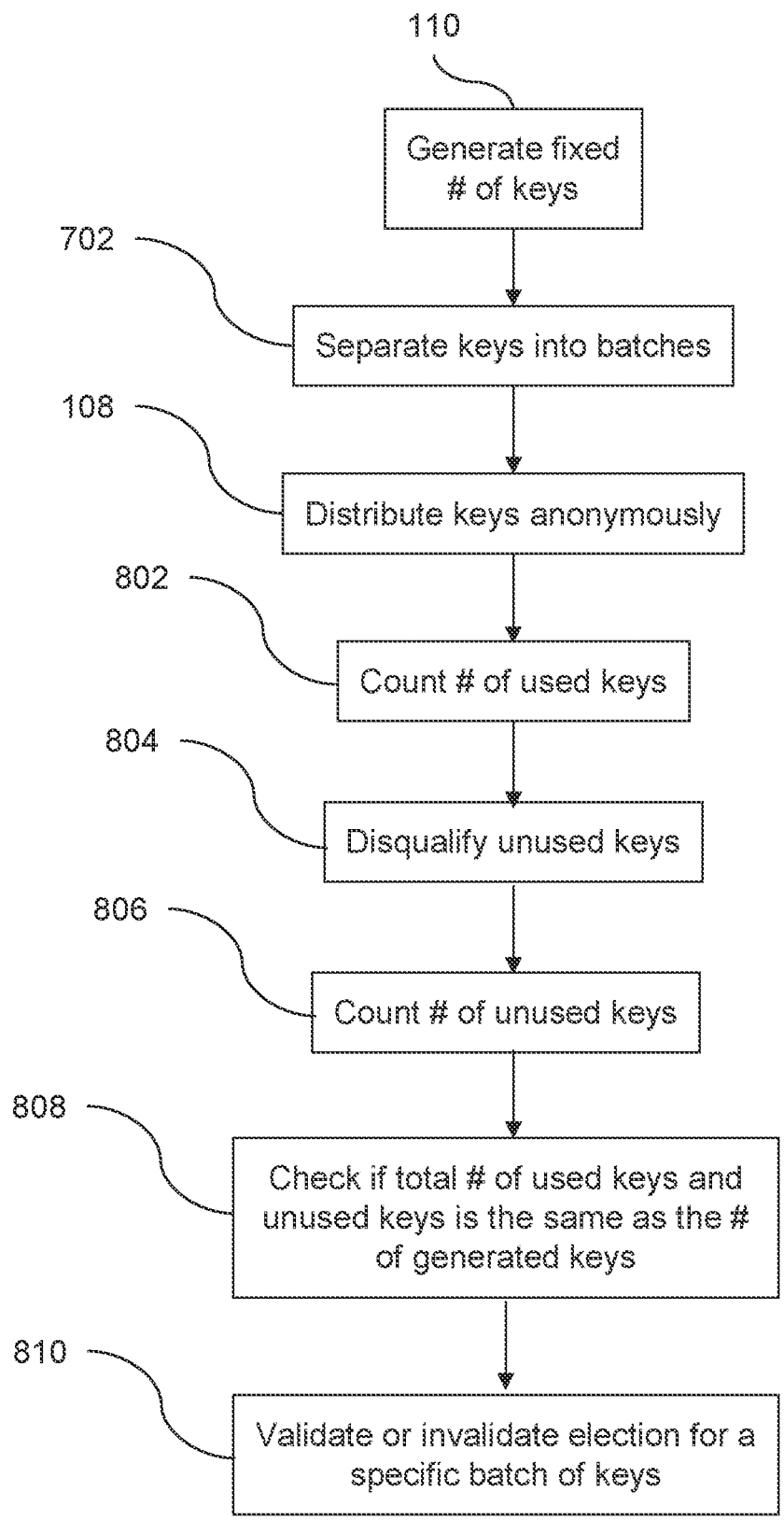
FIG. 8 is a flow chart illustration of a method of preserving anonymity and inhibiting cheating in a vote in accordance with an embodiment of the current invention.

In some embodiments, the system is configured to facilitate a voter hiding and/or falsifying 532 (e.g., see FIGS. 5 and/or 7) his vote. Optionally, the system may facilitate a voter supplying 128, 532 substantiation that he voted for any party. For example, after validation of the voter's vote, the voter can publish anonymously his private and public keys. Optionally, the system may supply 128, 532 a voter the option to show to other people substantiation that he voted differently than his actual vote. the system may supply 128, 532 a voter a different private key from his private key. For example, the supplied key may include a real private key of a real voter that voted for a different party. A voter may claim to have voted for the party of the anonymously published private key and/or hide his real vote. For example, the published public keys may not be visible to all. For example, anyone can ask for a public key that belongs to a vote to a specific party. In some embodiments, this facilitates a voter being able to claim that this was his vote. For example, this may inhibit buying or extorting votes, because a buyer/extorter will have difficulty knowing for whom the person that he is trying to influence really voted. In some embodiments, the time of a vote may be published, optionally the voter may be supplied 128 with an anonymously published key that was used in a similar timeframe to the time that he voted (e.g., from the same time block that he voted). The voter may use the supplied anonymous private key to prove that he voted for a particular party and that the ballot box got it, the ballot box knows that there is a vote that came from a voter who has a valid private key. Optionally there will be a waiting period before supplying 128 the anonymous published key and/or the anonymous published key may only be supplied to a voter who has checked 124, 126 and/or confirmed the accuracy of his vote. For example, this may allow the voter to "prove" (e.g., to prevent electoral fraud) for whom he really voted as a long as he hasn't verified his vote and/or until the end of the waiting period. Alternatively or additionally, there may be a table (which may not be public) of anonymously publicized votes (for example if a user presents a private key that is not on the list of published keys this may be better evidence that his vote was really the one connected to the key). Alternatively or additionally, the timing of votes may be used to reduce the possibility of use of someone else's private key to try to claim that the vote was changed. Optionally, after voting and/or after verifying a vote, a medium of a voter including his private and/or public key may be erased, scrambled, encrypted and/or otherwise rendered unreadable to the public. The medium may remain readable with a key that is kept secret. This may inhibit vote buying and/or coercion. The secret key may be kept by election authorities and/or courts and/or used to substantiate an accusation of electoral fraud.

In some embodiments, the distributed ledger may include a time that the key was distributed 108 to the voter and/or a time when the vote was received 120. The election commission and/or an interested party may compare the time of distribution 108 to the time of reception 120. If the time of reception 120 precedes the time of distribution 108 then the vote may be invalidated. If many such aberrations occur in one group of keys and/or one election the entire group and/or election may optionally be invalidated.

Exemplary Voting Process

Figure 9:
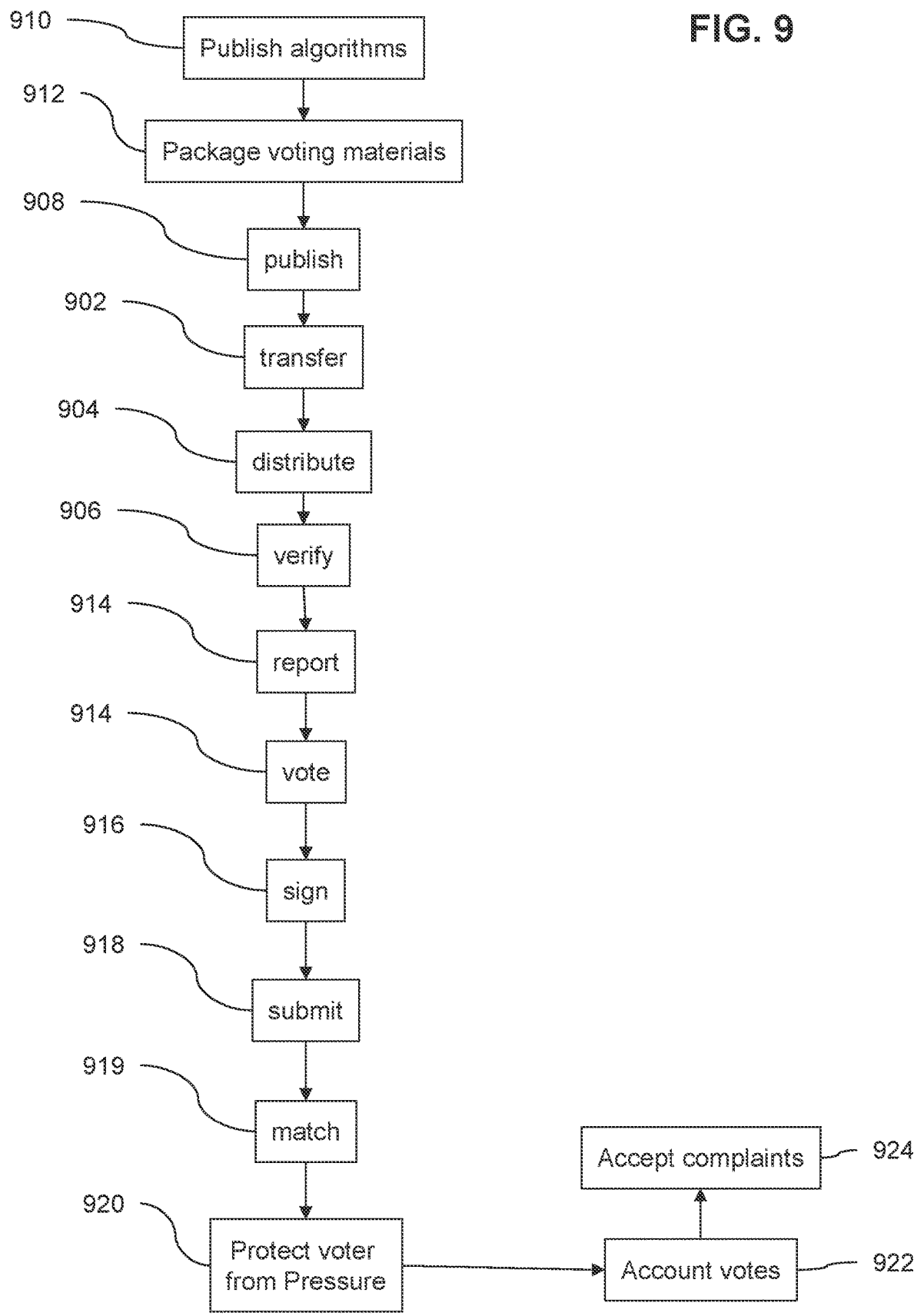
FIG. 9 is a flow chart illustration of a voting process in accordance with and embodiment of the current invention.

FIG. 9 is a flow chart illustration of a voting process in accordance with and embodiment of the current invention. Optionally, various embodiments of the invention may include some or all of the listed actions and/or in the same order and/or a different order then listed here. In some embodiments, a method of voting protects a voting process by applying natural laws (e.g., mathematics). Optionally, the system is self-secure and/or avoids the need to rely on the trustworthiness of a person and/or group of people.

In some embodiments, the algorithms of the voting process are published 910. This may facilitate interested parties to write an application that may be used to vote and/or to verify the voting.

In some embodiments, voting materials are packaged 912. Packaging 912 may include methods to inhibit stealing of materials, to preserve anonymity. For example, voting materials (e.g., a private and/or public keys and/or a public complaint key and/or half of private complaint key) may be packaged 912 in an envelope. The envelope is optionally anonymous, without identifying number or name printed on the outside of the envelope. The public keys and the private key are kept for later publication. In some embodiments, the second half of the private complaint key and/or a copy of a public complaint key are kept in a separate repository.

In some embodiments, some data is published 908, for example, to facilitate verification. For example, the public keys in the envelopes+a HASH of half the complaint key+a voting area to which the key belongs+a signature of a HASH function of each repository may be published. Optionally this will facilitate verifying the data was not changed after publication.

In some embodiments, publication may be accompanied by a signature (HASH). Optionally, this will inhibit changing the data after it has been published.

In some embodiments, the packaged 912 materials are transferred 902 to the election areas. For example, materials may be transferred to a post office branch and/or to designated voting stations.

In some embodiments, distributing the envelopes to the area in advance, may inhibit fraud. For example, if fraud is found in the election process, it may be possible to focus on the problematic area, and/or to repeat the election only in the same area. This may also assist in identifying the causes which participated in the fraud.

In some embodiments, the election can be kept fair even in the event of theft of packages and/or corruption of them and/or theft of the keys. For example, as explained herein the system may be protected by the natural laws and/or mathematics. Attempt to steal the elections may be detected and/or prevented. Protecting the packages may avoid invalidation of elections, e.g., due to destruction and/or theft of the envelopes that may lead to repeat part of the election process.

In some embodiments, a package is distributed 904 to persons who have the right to vote. Optionally, each person that comes to collect an envelope will be identified. Additionally or alternatively the process of receiving the envelope may be documented. Documentation on the distribution 904 is optionally published 908. For example, publishing 908 of receipt of the envelopes may be include:

a. Parties may automatically receive access to information. The parties may be committing to guarding the information. For example, each body may request access to the database, on the condition that it will be necessary, and compliance with the privacy conditions.

b. Alternatively or additionally, each voter may be able to verify the details of his receipt of materials. For example, a voter may enter his ID number and date it was issued and receive an answer if they are registered as a recipient of an envelope. In the case of a complaint by a citizen, the election commission will may reveal full documentation in them.

In some embodiments, Information may not be collected about the person's use of the package. Data may not be collected whether a particular individual voted or did not vote and/or there may be no identifying information on the package which would allow connection between the envelope to whoever collected it.

In some embodiments, a voter receiving the package may verify 906 its contents. For example, the voter scans codes on the package in order to verify 906 that the envelope is valid. The check optionally includes crosschecking of the private key with the published public key and/or half the complaint key with its published HASH. In this way the situation is optionally prevented in which envelopes are stolen and/or envelopes with a faulty complaint key are replaced to prevent a future complaint about a forgery of their contents.

In some embodiments, packages may be distributed 904 at branches of the post office, at dedicated voting stations and/or by messenger. The deliverer will optionally verify delivery of receipt of the envelope, the recipient will optionally verify that they received 3 keys. If there is a problem, the voter may complain and/or report irregularities.

Various interested parties may open an application for voting. The party may verify 906 the validity of a package. Additionally or alternatively the government may open an application that will be available.

Optionally a voter may vote 914 at a voting station with the assistance of a computer which will be supplied at the location. Additionally or alternatively the voter may vote 914 by a home computer and/or a cellular telephone. For example, a voter application may be supplied from a body trusted by them.

Allowing voters to vote 914 via an organization of their own choice may inspire confidence, and prevent people from feeling that something is tracking who they voted for.

In some embodiments, voting 914 is done by scanning the code in the package and/or selection of the party or candidate.

In some embodiments, the vote will be signed 916. For example, the voting application will sign with the vote with the private key and/or will submit 918 it together with the public key to an API of the voting system. For example, the user may open an API of a preferred organization and submit 918 the vote and/or key over a network and/or the user may visit a physical voting site to submit the vote and/or key. The API will optionally register the vote. In some embodiments, the system may inhibit voting twice and/or another entity using the user's key. For example, the API prevents repeated attempts to vote. For example, the system may inhibit voting fraud in the case where there is malicious code in the system that would attempt to allow voting twice.

In some embodiments, signed voting data will be published 908 to the public. For example, the voting data may be published at the end of the voting period. Optionally, the vote will be published including the private keys used to sign the votes. Publishing the private keys will inhibit them from being an identifying factor, since they are public information. Optionally, is no identifying information will be published with the private key, e.g., only what vote matches the specific public key, and/or what private key used it and/or when the vote was made. Optionally, any voter can verify that their vote is recorded that matches 919 his public key is written correctly, and in any case their vote will be counted correctly. In some embodiments, until the closing of the voting, these data are available only to the election commission.

In some embodiments, voters may be protected 920 from pressure to disclose their vote. For example, a voter may request, to receive "used" keys. The voter will be inhibited from voting with these keys. Optionally, this may inhibit external bodies from pressuring a person to disclose their voting data. For example, the voter can present the used keys which they received as their keys, and present a claim to have voted whichever vote they want. In this way, it will be difficult to put pressure on voters and/or to pay them to vote in a certain way, because it will inhibited to verify how they voted.

In some embodiments, at the end of the election votes and/or packages will be accounted 922 for. For example, all packages which have not been used (e.g., not delivered) will be disqualified. For example, at the end of the voting time, unused packages may be opened, and the election commission uses their private key to vote with them with the value "not in use". Additionally or alternatively, accounting 922 may include publication of the documentation of delivery of each package. For example, accounting may not reveal if an individual person voted or not, but that they received an envelope. Alternatively or additionally, further information may be made available only for party representatives and/or non-partisans. Optionally, the number of envelopes which were "not in use" plus the number of delivered envelopes is published. Interested party and/or anyone may check if the number of packages published in the first stage for each area matches the number delivered plus invalidated. A mismatch may indicate illegal use of envelopes not delivered to voters. This may inhibit theft of envelopes and/or their misuse.

In some embodiments, the system may receive 924 complaints. For example, at the end of the voting time and/or initial publication complaints may be accepted. For example, a voter may verify his vote. If he discovers that it was not counted properly, he may complain. Optionally, there may be a second pair of keys to facilitate receiving 924 and/or verifying complaints. Optionally, officially submitted complaints may be documented. For example, documentation may include the complainants' details. The complainant may present their public complaint key and/or may receive the send half of their private complain key, with the assistance of these two they may write a list of corrections. The corrections may be added to the previous vote (which will be saved and/or published). In the event that there is a correction registered, this record may change the original count. In some embodiments, accepting complaints inhibits a person from stealing a package and/or using it and/or to returning it. If a package has been used by someone f to the package of envelopes. For example, when the real voter comes to vote he would not be able to vote and/or would complain. Alternatively or additionally, if a hack would get into the system and change vote and/or vote with the aid of the keys they stole before the voting values were published. For example, such foul play may be detected and/or reversed when voters complain and/or change their vote.

In some embodiments, the complaint stage is documented. The complainer may be required to produce a physical package and/or physically arrive and/or identify himself. This may make it difficult to steal complaint keys. Also, if a person steals complaint keys including the half of the election commission they may still be required to be documented as a complainant. Optionally, when a voter validates his vote the process the voter verifies their vote, they will find that the complaint in their name and changed their vote, the election commission is required to present a record of a complaint, or we will know for sure that there was cheating here. Optionally, complaints are published. A voter may check complaints and/or further complain, if their vote was changed without them complaining. Optionally the election commission presents documentation of the complaint and/or justifies changes.

In some embodiments, the publication of results make is possible for private individuals and/or organizations to count for themselves and/or verify election results. There are problems which may imply significant cheating and/or may result in invalidation and/or repeat of elections in general and/or in the area where they happened (and/or a criminal investigation). For example, where there are a lot of complaints that votes were changed, and/or where the voting commission lacks documentation of complaints. For example, where the number of envelopes distributed to people plus the number of envelopes that voted "not in use" significantly differ from the number of keys published in the first stage for this area.

In some embodiments, the system inhibits problems that may cause rigged elections. For example, there may be a leak of the contents of packages before distribution and/or voting, and/or false voting with other people's keys. Optionally, this problem may be solved because: when people come to vote, will API give them a fault message. The voter may then file a complaint with the police about the theft. Their proof that they are the real key owners may be by producing the public key and/or the half complaint key. If unused packages are stolen, then the extra votes above the number of a distributed packages will be accounted for.

False complaints may be inhibited in some embodiments. For example, false complaints may be inhibited by requiring evidence of real ownership of the package and/or identification of the complainant.

For voters who find the system hard to use, each party may have its own API and offer services to help their populations to vote.

Figure 10:
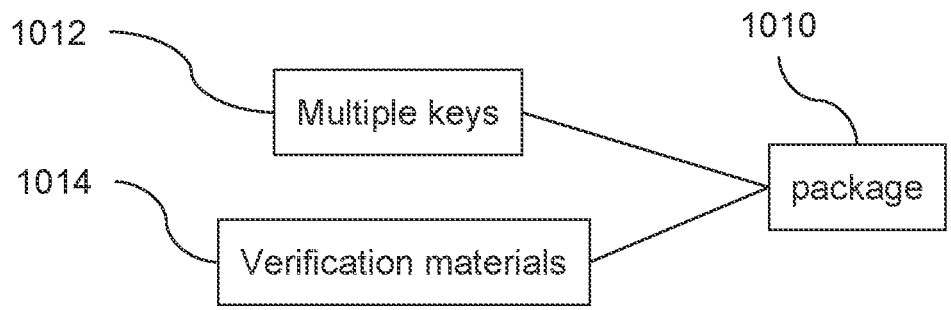
FIG. 10 is a block diagram illustrating a ballot package in accordance with an embodiment of the current invention.

FIG. 10 is a block diagram illustrating a ballot package 1010 in accordance with an embodiment of the current invention. In some embodiments, a voter receives a package with multiple keys 1012. Note that the package and/or voter may be anonymous. For example, the multiple keys 1012 may include a voting key and/or a change (e.g., cancel) key, for example as described in embodiments herein above. For example, the voter may use the vote key to vote and/or to check a public roster that his vote was recorded properly. If the vote was not recorded properly the voter may use the cancel key to change the vote and/or cancel the vote. For example, use of the cancel key may require the voter to verify his status and/or identity and/or to get a second cancel key from a voting commission. In some embodiments, there may be a system to insure that when the voter gets a package all of the materials (e.g., keys 1012) are correct and match. For example, the package 1010 may include verification materials 1014. For example, verification materials 1014 may include hash code that verifies that the various keys are all there and match (e.g., this may inhibit tampering with voting packages before they arrive to the voter). For example, the package may include the keys 1012 and/or verification materials 1014 as code on a computer readable medium. For example the package 1010 include an envelope containing printed bar codes or QR codes. A voter may scan the codes to vote or change a vote. Optionally, the package will also contain a verification code. For example, the verification code may include a hash code. For example, the voter scans the verification code and then the voting keys 1012. If the keys are wrong and/or do not match then a hash function may return an error value warning the user that the packages has been tampered with. Optionally, the verification hash key may be printed directly on a package. For example, keys 1012 may be printed on a card packaged in an envelope and the verification key may be printed on the envelope.

Figure 11:
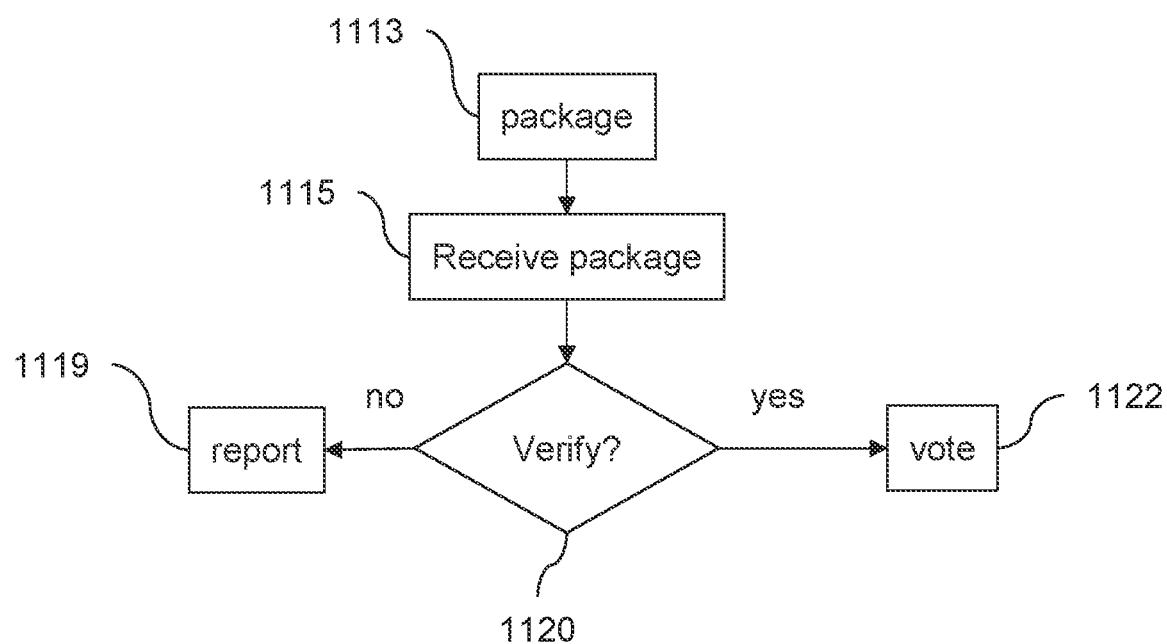
FIG. 11 is a flow chart illustration of verifying a received voter package in accordance with an embodiment of the current invention.

FIG. 11 is a flow chart illustration of verifying a received voter package in accordance with an embodiment of the current invention. In some embodiments, voting materials are packaged 1113 and/or sent to a voter (for example as described in any of the embodiments described herein above). Optionally the package contains voting materials (e.g., voting keys and/or cancel keys) and/or verification materials (e.g., to verify that the package has not been tampered with). When a user receives 1115 the package may he optionally verifies 1120 the package and/or its contents (e.g., as described herein above). For example, a hash function may be used to verify that all of the keys in the package are correct and/or match. For example, if the verification 1120 shows that the keys are valid and match then the voter may use them to vote 1122. If the contents fail the verification 1120, the voter may report the anomaly to an election party, the election commission, law enforcement and/or another party. Additionally or alternatively, the voter may receive a new package 1110.

It is expected that during the life of a patent maturing from this application many relevant technologies for example for transferring data and/or protecting data privacy will be developed and the scope of the terms in the specification (e.g., medium, dongle, private key and/or public key) are intended to include all such new technologies a priori.

As used herein the term "about" refers to ±10% unless stated otherwise.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. When multiple ranges are listed for a single variable, a combination of the ranges is also included (for example the ranges from 1 to 2 and/or from 2 to 4 also includes the combined range from 1 to 4).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for on-line voting comprising:
    supplying a plurality of private keys and a plurality of associated public keys and verification materials;
    distributing a respective private key from said plurality of private keys and an associated public key of said plurality of associated public keys and associated verification material of said verifications materials anonymously to each respective voter of a plurality of voters;
    publishing a list of the plurality of associated public keys on a secure public ledger;
    verifying said respective private key and associated public key of said each respective voter with said associated verification material;
    receiving an encrypted vote, encrypted with the respective private key of the respective voter;
    recording the encrypted vote on a said secure public ledger; and
    reading said encrypted vote from the secure public ledger for counting an election result.

2. The method of claim 1, further comprising:
    publishing in said secure public ledger a time of receiving of each said respective private key of each of said plurality of voters.

3. The method of claim 2, wherein said time is approximate.

4. The method of claim 1, wherein said secure public ledger includes a block chain.

5. The method of claim 1, further including:
    validating said encrypted vote by an election commission and
    further encrypting said encrypted vote after said validating with a private key of said election commission resulting in a double encrypted validated vote and wherein said recording is of said double encrypted validated vote.

6. The method of claim 1, wherein said associated verification material include a hash key and said verifying includes checking said respective private key and associated public key against the hash key.

7. The method of claim 1, further comprising:
    publishing on said secure public ledger a list of voters having received said respective private key.

8. The method of claim 1, wherein said distributing includes distributing a respective vote changing key of a plurality of vote changing private keys, the method further comprising adding a changed vote encrypted with said respective vote changing key after said recording and wherein said counting said election result includes counting said changed vote and not counting said vote encrypted with said respective private key.

9. The method of claim 1, further comprising:

separating said plurality of private keys into batches and wherein said distributing is separate for each of said batches.

10. The method of claim 1, further comprising:

supplying a mechanism to the respective voter to check that his vote is recorded properly on said secure public ledger.

11. A system for on-line voting comprising:

a plurality of private keys and a plurality of associated public keys and verification materials wherein a respective private key of said plurality of private keys and an associated public key of said plurality of associated public keys and an associated verification material of said verification materials is supplied anonymously to each respective voter of a plurality of voters;

a secure public ledger including a list of the plurality of associated public keys; and a vote of the respective voter encrypted with the respective private key of the respective voter and wherein said associated verification material contains a hash function for checking validity and matching of the respective private key and associated public key.

12. The system of claim 11, further including:

a validation private key and wherein said vote is validated by an election commission and encrypted with said validation private key resulting in a double encrypted validated vote and wherein said vote of the respective voter in said secure public ledger includes said double encrypted validated vote.

13. The system of claim 12, wherein said secure public ledger further includes a time of receipt; said time of receipt including a time when the respective voter received the respective private key.

14. The system of claim 11, further comprising:

a respective vote changing private key for each said respective private key and wherein the system is further configured for adding a changed vote encrypted with said respective vote changing to said secure public ledger.

15. The system of claim 11, wherein said plurality of private keys are separated into batches.

16. The system of claim 11, further comprising:

a mechanism for the respective voter to check that his vote is recorded properly on said secure public ledger.

17. The system of claim 11, further comprising:

a substantiation of a vote of configured for sending to said respective voter.

* * * * *